(12) United States Patent
Eatedali et al.

(10) Patent No.: US 10,536,735 B2
(45) Date of Patent: Jan. 14, 2020

(54) PURCHASING AND VIEWING CONTENT BASED ON A LINEAR BROADCAST

(71) Applicant: Disney Enterprises, Inc., Burbank, CA (US)

(72) Inventors: Josiah Eatedali, Los Angeles, CA (US); Mark Arana, West Hills, CA (US)

(73) Assignees: DISNEY ENTERPRISES, INC., Burbank, CA (US); EIDGENOESSISCHE TECHNISCHE HOCHSCHULE ZURICH, Zurich (CH)

( * ) Notice: Subject to any disclaimer, the term of this patent is extended or adjusted under 35 U.S.C. 154(b) by 0 days.

(21) Appl. No.: 14/464,614

(22) Filed: Aug. 20, 2014

(65) Prior Publication Data
US 2016/0057471 A1    Feb. 25, 2016

(51) Int. Cl.
*H04N 21/2543* (2011.01)
*H04N 21/472* (2011.01)
*H04N 21/437* (2011.01)
*H04N 21/8547* (2011.01)
*H04N 21/2343* (2011.01)
*H04N 21/462* (2011.01)
*H04N 21/482* (2011.01)

(52) U.S. Cl.
CPC . *H04N 21/25435* (2013.01); *H04N 21/23439* (2013.01); *H04N 21/437* (2013.01); *H04N 21/4622* (2013.01); *H04N 21/472* (2013.01); *H04N 21/47211* (2013.01); *H04N 21/482* (2013.01); *H04N 21/8547* (2013.01)

(58) Field of Classification Search
CPC ....... H04N 21/25435; H04N 21/47211; H04N 21/437; H04N 21/8547; H04N 21/23439; H04N 21/4622; H04N 21/472; H04N 21/482
See application file for complete search history.

(56) References Cited

U.S. PATENT DOCUMENTS

| | | | |
|---|---|---|---|
| 8,719,891 B1* | 5/2014 | Aldrey | H04N 21/25866 725/105 |
| 2002/0059610 A1* | 5/2002 | Ellis | H04N 5/44543 725/58 |
| 2002/0144116 A1* | 10/2002 | Giobbi | G06F 21/10 713/168 |
| 2008/0141317 A1* | 6/2008 | Radloff | H04N 5/44582 725/87 |
| 2013/0067021 A1* | 3/2013 | Broberg | H04N 21/47202 709/217 |
| 2014/0114919 A1* | 4/2014 | Woods | H04N 21/23109 707/634 |

* cited by examiner

*Primary Examiner* — Yassin Alata
(74) *Attorney, Agent, or Firm* — Sheppard Mullin Richter & Hampton LLP

(57) ABSTRACT

Systems and methods for obtaining alternative versions of media content are provided. Digital purchasing technology can be integrated with content viewing technology to provide dynamic content discovery and the ability to easily and efficiently obtain alternative media content to enhance a user's viewing experience. Additionally, a user's viewing experience can be upgraded by easily and efficiently allowing for the viewing of previously obtained alternative media content.

12 Claims, 9 Drawing Sheets

DURING A BROADCAST OF MEDIA CONTENT TO A USER DEVICE, PRESENT AT LEAST ONE OPTION TO A USER TO EXPERIENCE AN ALTERNATIVE VERSION OF THE MEDIA CONTENT
400

UPON SELECTION OF THE AT LEAST ONE OPTION, PRESENT THE ALTERNATIVE VERSION OF THE MEDIA CONTENT TO THE USER DEVICE
402

FIG. 4G

PURCHASING AND VIEWING CONTENT BASED ON A LINEAR BROADCAST

TECHNICAL FIELD

The present disclosure relates generally to media content broadcast systems.

DESCRIPTION OF THE RELATED ART

Broadcasting can refer to the distribution of media content (e.g., audio, video, etc.) to a dispersed audience via some mass communications medium. The mass communications medium may be a cable network, a data network, radio waves, and the like. Digital distribution can refer to the delivery of media content without the use of physical media. Digital distribution has become popular due to advances in computer networking and communication technologies.

BRIEF SUMMARY OF THE DISCLOSURE

Various embodiments are directed to obtaining and presenting alternative versions of media content. Such alternative versions of media content can be obtained through digital purchasing or other technology integrated into a viewing environment. Additionally, such alternative versions of media content can be pre-purchased/rented and dynamically presented to a user to upgrade the user's viewing experience.

In accordance with one embodiment, a computer-implemented method comprises presenting at least one option to a user to experience an alternative version of media content during a broadcast of the media content to a user device. Upon selection of the at least one option, the alternative version of the media content is presented to the user device.

In accordance with another embodiment, a non-transitory computer readable medium has computer executable program code embodied thereon. The computer executable program code is configured to cause a processor to present alternative viewing options of a program listed on an electronic program guide (EPG) for linear broadcast transmission. The computer executable program code is configured to further cause the processor to begin playback of an alternative version of the program on a user device upon receiving an alternative viewing option selection from a user for the program.

In accordance with yet another embodiment, an apparatus comprises a processor configured to transmit an alternative version of a broadcast version of media content to a user device, wherein the processor is configured to receive an indication from a user of the user device to view the alternative version of the media content, the processor being further configured to send the alternative version of the media content to the user device.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4G is an operational flow diagram illustrating an example process for obtaining alternative viewing options in accordance with various embodiments.

Figure 1:
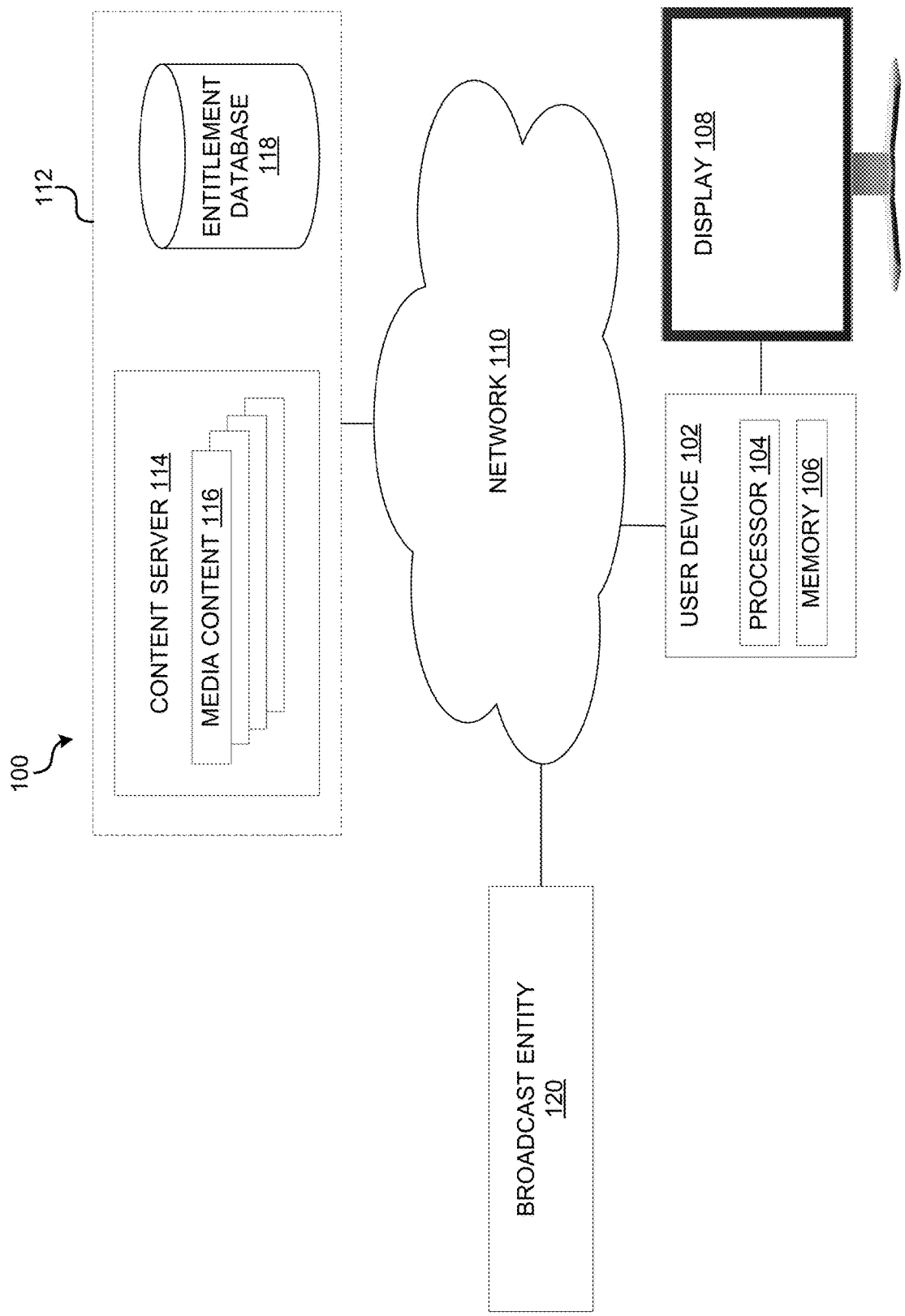
FIG. 1 illustrates an example environment in which various embodiments may be implemented.

The figures are not exhaustive and do not limit the present disclosure to the precise form disclosed.

DETAILED DESCRIPTION

Traditional broadcasting, such as television broadcasting or radio broadcasting may be thought of as being "linear." That is, the audience has no control over what is being broadcast or when content can be consumed. Accordingly, a television program must be watched at a scheduled time and on a channel set by the television program provider, e.g., television broadcast network, prohibiting any type of interaction or alternative viewing mechanism(s).

However, "non-linear" broadcasting technology, such as Video on Demand (VOD) technology, allows a consumer to select particular media content for viewing at a time of their choice. Viewing VOD media content can be provided for a fee or as part of a paid subscription, e.g., a cable subscription package from a cable provider. Another example of non-linear broadcasting, i.e., digital video recorder (DVR) technology, allows a consumer to digitally record linear broadcast media content via a DVR unit, set-top box, or similar device, for viewing at a time of their choosing. Moreover, playback options such as pause, rewind, etc. allow for further interaction with the VOD and/or the DVR'ed media content.

Common to broadcasting media content, both linear and non-linear, and regardless of whether the media content is transmitted via cable, satellite, on-line streaming media, etc., is the inclusion of advertising in the form of commercials. Such commercials may be inserted at a particular time during the broadcasting of media content or embedded in a streamed media content file, for example. The use of commercials has been and continues to be a ubiquitous method of obtaining revenue for content providers, such as television broadcast networks. However, many consumers find the forced viewing of commercials to be overly intrusive/disruptive to their viewing experience, or at the very least, annoying.

Moreover, linear broadcasting provided by, e.g., television networks, must often comport with various rules and regulations. For example, it is a violation of federal law to air "indecent" programming or "profane" language during certain hours. Therefore, media content, such as movies originally intended for theatrical release may require a certain amount of censorship when broadcast over a television network, e.g., bleeping of profane language, editing out scenes with nudity, etc. Additionally, and due to broadcast time constraints on television networks, movies that are broadcast over a television network may have to be shortened by editing out portions of the movie. These alterations to the media content can also affect the viewing experience when compared to viewing the movie in its unedited and/or uncensored form.

Accordingly, various embodiments described in the present disclosure provide systems and methods that allow a user to obtain media content in an uncensored, unedited, advertisement-free, and/or otherwise unaltered format. Moreover, the media content can be obtained in a dynamic or "on-the-fly" manner. It should be noted that any alternative version of media content can be obtained, such as for example, a director's cut version, an extended version, an enhanced version (e.g., media content including director/actor commentary), related media content, etc. Furthermore, various embodiments described in the present disclosure provide systems and methods that allow for any purchased, rented, or otherwise previously obtained media content to be consumed dynamically or on-the-fly.

Figure 3A:
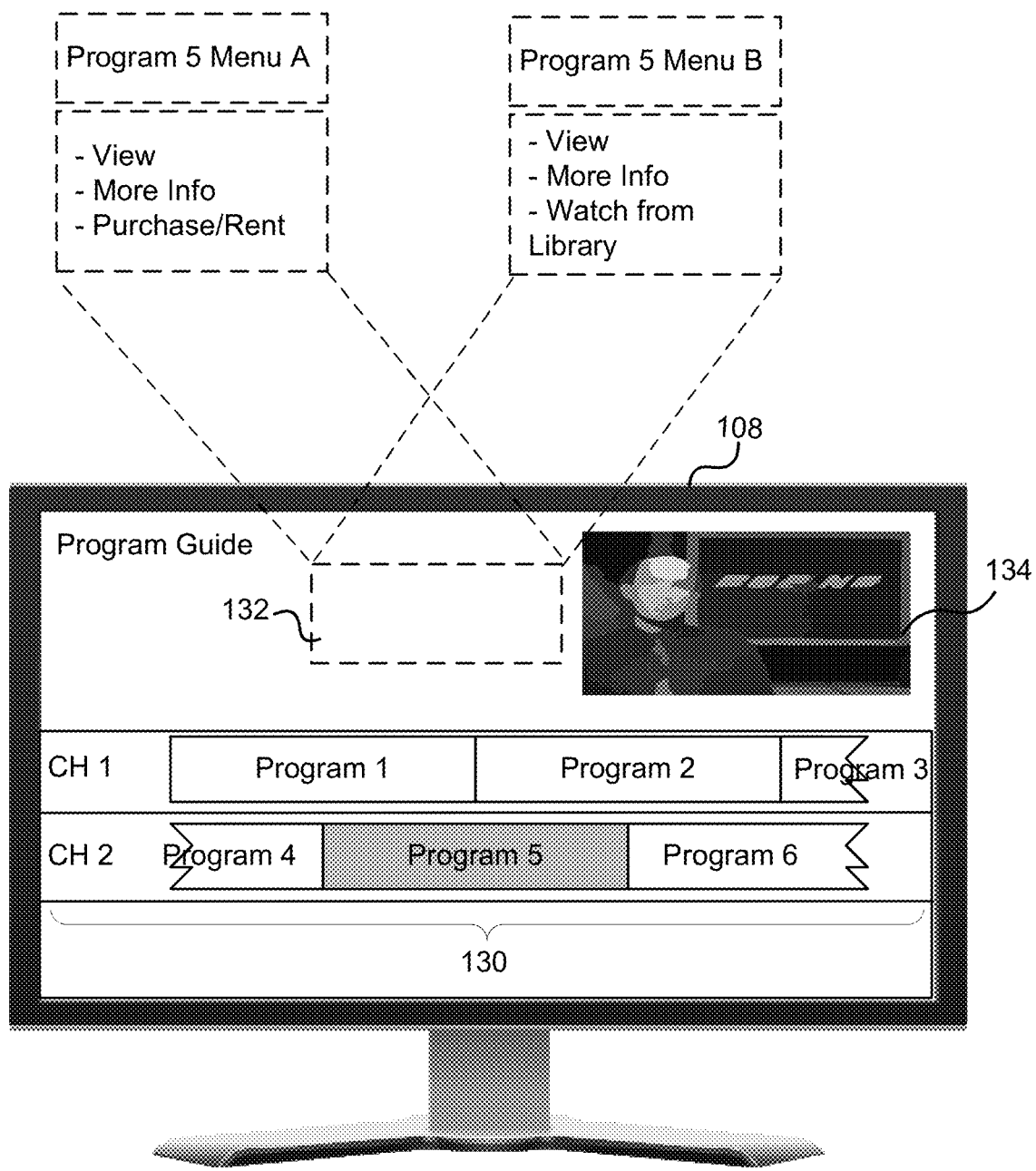
FIG. 3A illustrates an alternative viewing GUI incorporated into an example EPG in accordance with various embodiments.

For example, as shown in FIGS. 3A, 3B, and 4A-4F (described in greater detail below), a viewer watching a televised version of a movie on a television broadcast network can choose to purchase or rent an alternative version of that same movie, the alternative version being, e.g., advertisement-free and unedited. Upon purchasing or renting the alternative version of the movie, presentation of the movie can switch from the televised version to the alternative version. Hence, the viewer need not substantially interrupt his/her viewing experience to purchase or rent the alternative version of the movie. It should be noted that presenting one or more options for purchasing or renting an alternative version need not originate in a linear broadcast, but can also be provided when a viewer is viewing, e.g., DVR'ed media content. Further still, as shown in FIG. 3A, the one or more options for purchasing or renting an alternative version can be presented to the viewer via an electronic program guide (EPG), without a need for the viewer to actually be viewing the media content.

That is, and in accordance with various embodiments, the viewer does not need to engage in the following actions when obtaining media content in a conventional manner: decide/choose beforehand, to view an alternative version of media content; separately access a transaction-specific environment; purchase or rent the alternative version of the media content in the transaction-specific environment; and subsequently switch to a viewing environment to view the alternative version of the media content.

Figure 4A:
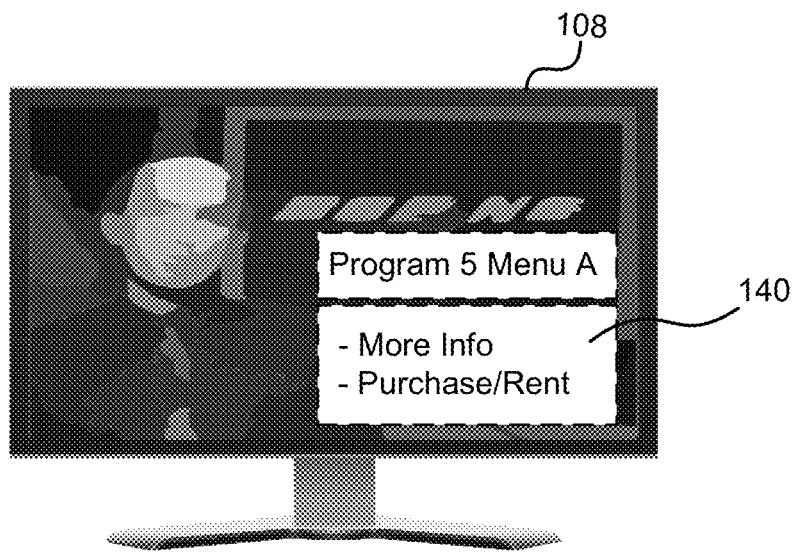
FIGS. 4A and 4B illustrate additional alternative viewing GUIs incorporated into example viewing environments in accordance with various embodiments.

Rather, and in accordance with various embodiments and shown in FIG. 4A, the viewer can be presented with the option to purchase or rent the alternative version while already viewing the televised version. Upon selecting an option to purchase or rent the alternative version, the purchase or rental transaction can occur in the background, and the alternative version can automatically replace the televised version. In accordance with other embodiments, the viewer can automatically be redirected to a transaction environment, e.g., an e-commerce site, to engage in the purchase or rental transaction as shown in FIG. 4C. In accordance with still other embodiments, the viewer can be automatically presented with a transaction environment interface to purchase or rent the alternative version. In any of the aforementioned scenarios, and at the very least, there is no decision that has to be made by the viewer to actively seek out and purchase/rent desired media content prior to viewing the desired media content. Accordingly, various embodiments allow for a dynamic, on-the-fly viewing and transaction environment that can better address viewing habits, as well as provide a simple and efficient mechanism for content discovery.

When replacing the televised version, playback of the alternative version can continue based upon the specific time/point in the media content where the viewer opted to purchase or rent the alternative version. Alternatively, playback can restart from the beginning of the alternative version of the media content. Options for continued playback and restarted playback can be presented to allow the viewer to select his/her preference for viewing the alternative version as shown in FIG. 4D.

Moreover, the television broadcast network and/or media content provider can provide one or more up-sell options to the viewer. For example, an option could be provided to the viewer to purchase or rent, not only the alternative version of the movie, but sequels, prequels, or in the case of, e.g., television or cable network series, entire seasons, other episodes, etc., as shown in FIG. 4E. Hence, in accordance with various embodiments, purchase and rental transactions can integrate existing digital transaction/third-party technology into media content viewing technology.

Figure 3B:
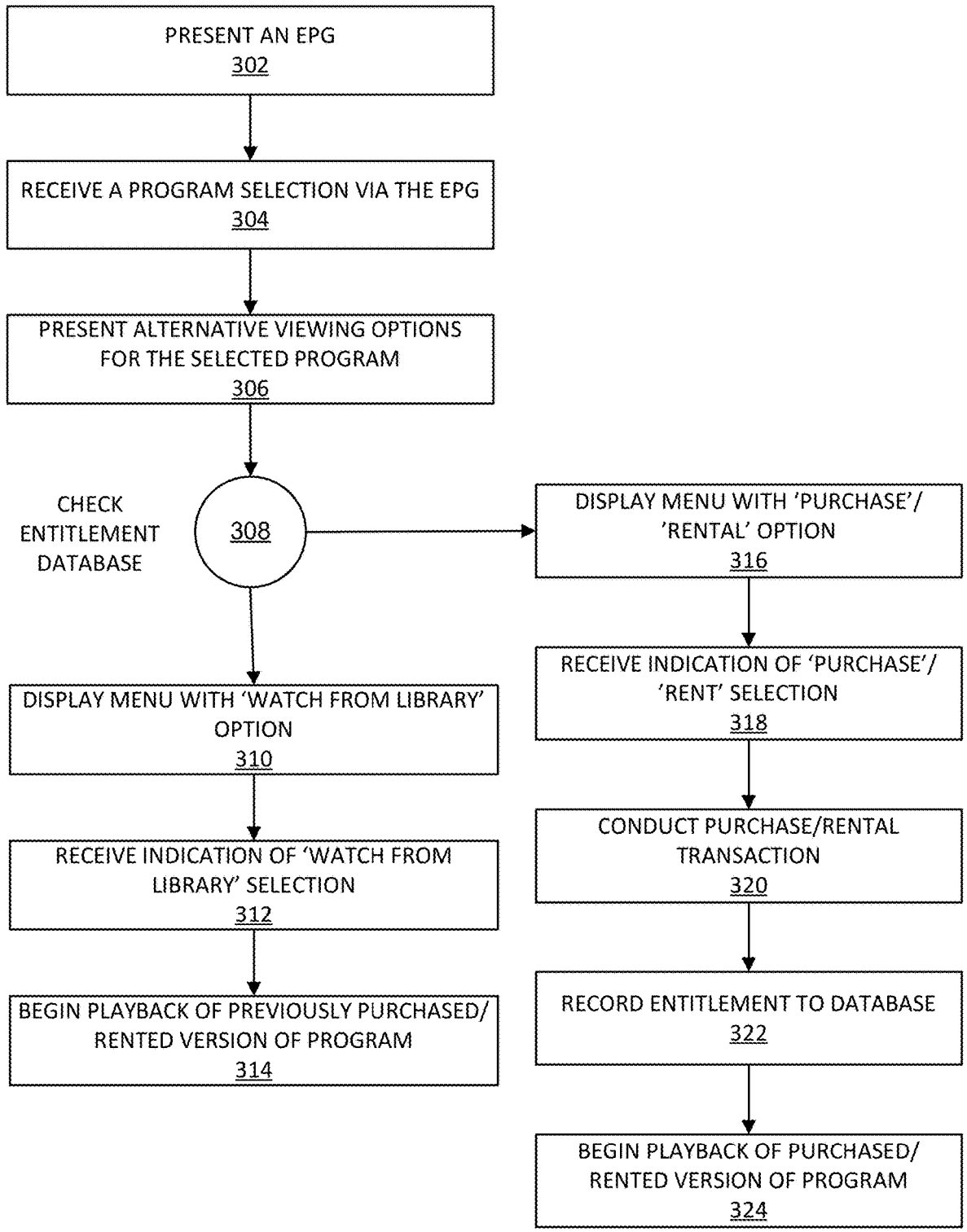
FIG. 3B is an operational flow diagram illustrating an example process for obtaining alternative viewing options in accordance with various embodiments.

As another example, a viewer may again be watching a televised version of a movie on a television broadcast network when the viewer recognizes that he/she had previously purchased/rented an alternative version of the movie. Accordingly, the viewer may switch to viewing the existing copy of the alternative version instead of the televised version (FIGS. 3A and 3B). As described previously, and in accordance with some embodiments, presentation of the option to switch or replace the televised version with the alternative version can occur during the viewing of DVR'ed content, during the display of an EPG (FIGS. 3A and 3B), etc., and not necessarily while viewing actual media content. The presentation of the option to replace the televised version with the alternative version can be prompted by scanning, e.g., the currently playing media content and/or the EPG.

Figure 4B:
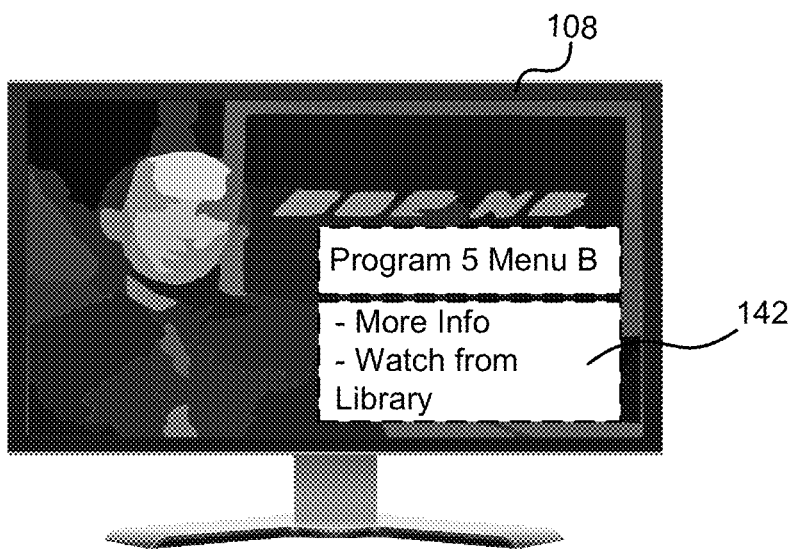
Figure 4C:
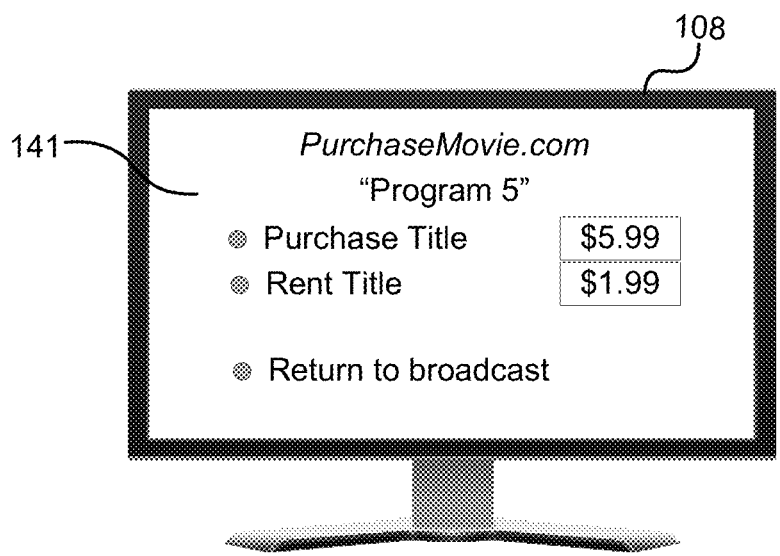
FIG. 4C illustrates a transaction environment for completing the purchase or rental of alternative media content in accordance with various embodiments.
Figure 4D:
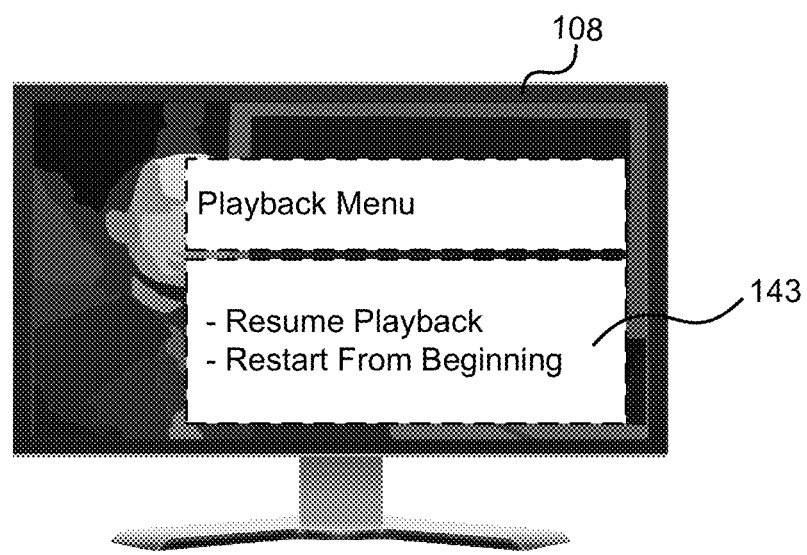
FIG. 4D illustrates a playback options menu in accordance with various embodiments.
Figure 4E:
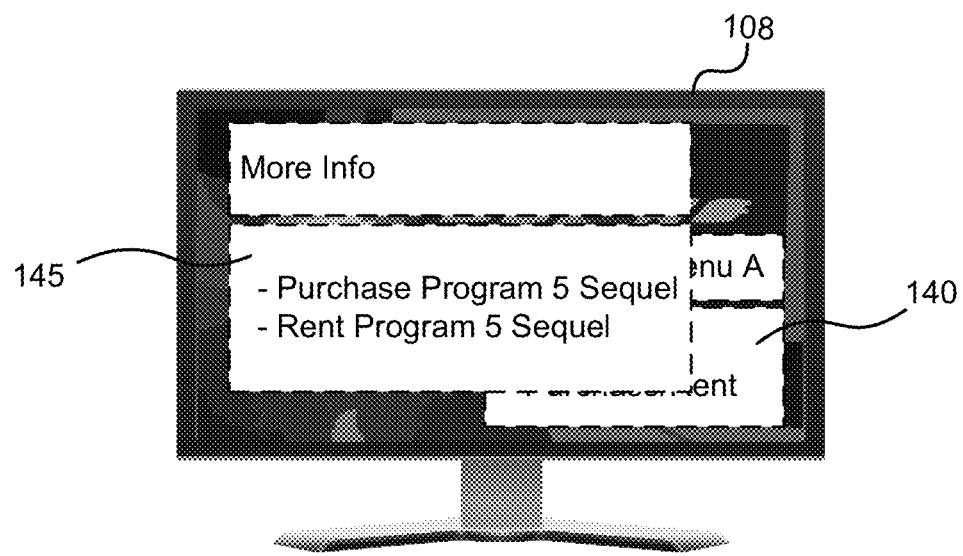
FIG. 4E illustrates an up-sell options menu in accordance with various embodiments.
Figure 4F:
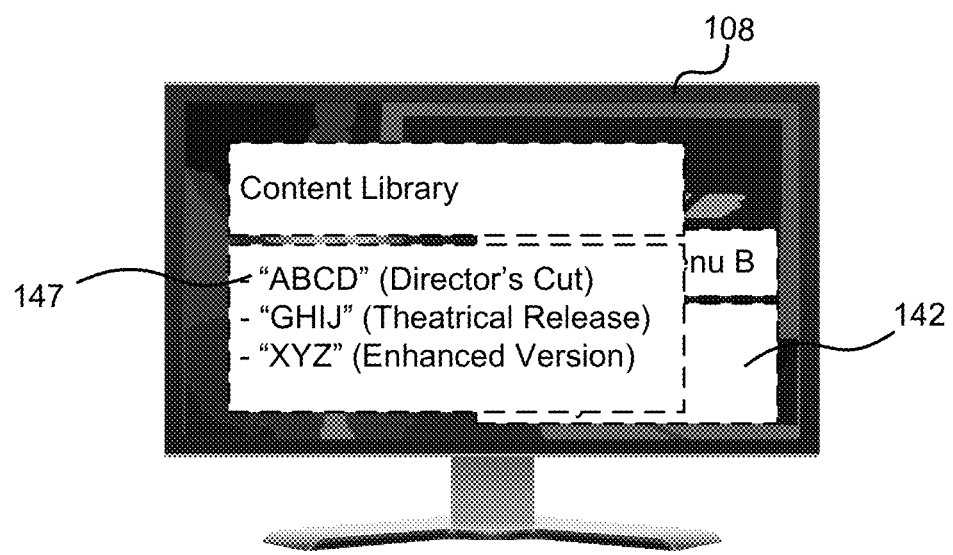
FIG. 4F illustrates a content library list for presenting previously obtained alternative media content in accordance with various embodiments.

Alternatively, the viewer can be presented with, e.g., a listing of previously obtained media content that the viewer can search/peruse for an existing, alternative version of media content that is currently being broadcast or displayed/included in an EPG, as shown in FIG. 4F. Playback of the alternative version can be continued from a current playback point or restarted from its beginning. Hence, a viewer is given the opportunity to upgrade his/her viewing experience.

FIG. 1 is a diagram illustrating an example environment in which various embodiments can be implemented. FIG. 1 illustrates a system 100 for obtaining and consuming alternative media content. As illustrated in FIG. 1, system 100 can include a user device 102. User device 102 may include a processor 104 and a memory unit 106, and can be configured to store downloaded digital media content, stream digital media content, etc. for presentation on a display 108. User device 102 may further be configured to receive conventional linear and non-linear broadcast media content for presentation on display 108, as well as present an EPG on display 108. User device 102 may be a DVR, a cable/satellite/internet protocol television (IPTV) set-top box, a gaming console, a tablet personal computer (PC), a smart phone, a laptop PC, etc. Display 108 may be a TV, monitor, or other presentation/media content consumption apparatus. It should be noted that in some embodiments, a separate display may be not be necessary. For example, the viewing of broadcast and alternative versions of media content can occur on a smart phone or tablet PC.

System 100 may further include a content provider 112, which may be a broadcast entity, such as a television broadcast network entity (e.g., ABC), a cable provider (e.g., COMCAST®), or any other digital media content distributor, such as Amazon®, iTunes®, Netflix® or other third-party distributor. Content provider 112 may include a content server 114 on which digital media content 116 can be stored, along with any required entitlements which can be maintained in entitlement database 118.

It should be noted that in certain scenarios where content provider 112 is, e.g., a digital media content distributor, such as Amazon®, iTunes®, etc., user device 102 may receive conventional broadcast media content from a separate broadcast entity 120, such as a cable provider. That is, and in accordance with the previously described scenarios, a viewer may view a televised version of a movie received at user device 102 (which may be a set-top box) from broadcast entity 120 (which may be a cable provider) and displayed on display 108 (which may be a TV). Upon choosing to view an alternative version of the movie, the viewer can purchase or rent the alternative version of the movie from content provider 112 (which can be a digital media content distributor, such as iTunes®). Thereafter, the alternative version of the movie can be viewed on display 108 via user device 102 through, e.g., a VOD service provided by broadcast entity 120. Alternatively still, playback can switch from broadcast entity 120/user device 102 to an appropriate digital media extender, e.g., Apple TV®, working in conjunction with content provider 112. That is, broadcast feeds can switch from a linear broadcast feed or other broadcast entity feed, such as a DVR feed to, e.g., a digital streaming feed.

The process of purchasing or renting the alternative version of the movie can be initiated by presenting an option to the user to purchase or rent the alternative version(s) of the movie during presentation of the televised version of the movie on display 108. Upon the viewer selecting the option to purchase or rent an alternative version of the movie, an iTunes® transaction interface can be presented to the viewer to complete the purchase or rental transaction. Alternatively, the viewer can automatically be redirected to an iTunes® transaction environment to complete the transaction via the aforementioned VOD service, or to provide further flexibility, via a smartphone application or separate instance of the digital media content distributor, e.g., iTunes®.

In scenarios where interactions may occur between a third-party distributor, e.g., iTunes®, and a broadcast entity, e.g., COMCAST®, various embodiments may utilize "key chest" technology in order to provide proper distribution of digital media content between different entities. That is, an entity, such as a cable provider can obtain digital media content access authorizations from a central key repository, and appropriate digital rights management (DRM) licenses can be provided to and stored in entitlement database 118. An example of such key chest technology is described in U.S. Pat. No. 8,452,016 entitled "Interoperable Keychest for Use by Service Providers," which is assigned to the assignee of the present disclosure, and which is incorporated herein by reference in its entirety.

It should be noted that to further streamline the transactional aspect of various embodiments, a viewer may be allowed to "pre-link" their respective third-party distributor account with their broadcast entity account. Accordingly, any payments, authentication/authorization, and/or entitlement actions between the entities can be performed automatically and/or in the background.

In accordance with another embodiment, and as described above, content provider 112 and digital media content distributor may be the same entity. For example, the VOD technology used by, e.g., COMCAST®, can be adapted in accordance with various embodiments to provide the ability to purchase or rent alternative versions of media content. That is, content server 114 can store linear broadcast versions of media content 116 as well as alternative versions of media content 116. Any required DRM licenses or other entitlement information can be created, stored, maintained, and/or distributed via entitlement database 118, which also falls under the control of content provider 112.

It should be noted that one or more licenses or temporary licenses can be created, utilized, and/or transferred to the appropriate entities in accordance with various embodiments. Such licenses can be configured to account for varying levels of access and/or distribution, time limits, usage limits, as well as partitioned if need be. For example, in accordance with the above-described example, broadcast entity 120 may obtain, e.g., a temporary license to an alternative version of some media content, from content provider 112. In this way, a viewer is allowed to rent the alternative version of that media content for viewing via the VOD interface of broadcast entity 120.

In the event that the viewer wishes to upgrade his/her viewing experience by viewing an existing, alternative version of media content that is currently being broadcast or displayed/included in an EPG, a local content server can be accessed. For example, user device 102 may access memory 106 where such pre-purchased/pre-rented alternative versions of media content can be stored and subsequently presented for viewing. The local content server may also be a separate memory/database (not shown) that is accessible by user device 102. Again, any requisite entitlement information, such DRM licenses and the like, can be forwarded/exchanged as needed.

Network 110 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 110 may employ various communication media, such as a coaxial cable, fiber optic cable system, Ethernet, radio waves, etc.

As alluded to previously, the presentation of the option to effect replacement of a televised version with an alternative version can be prompted by scanning currently playing media content and/or an EPG, for example. In particular, metadata that can be used to identify media content may be passed along with the media content. A broadcast entity or user device can identify the media content that is being viewed and/or is scheduled/presented in an EPG. Accordingly, the media content can be matched or associated with alternative versions of the media content for presentation to a viewer.

In accordance with one embodiment, the identifying metadata can be an Entertainment ID Registry (EIDR) handle. The EIDR is an industry registry/international standard based on the Digital Object Identifier (DOI), International Organization for Standardization (ISO) standard 26324. The EIDR registry provides global identifiers for media content, such as video entertainment assets, and may be cross-referenced with existing ID systems. EIDR handles can be used to identify and/or link different versions of media content, such as the aforementioned director's cut versions, edited for TV versions, or even versions having different formats (e.g., standard definition, high definition, etc.), any or all of which may be leveraged in accordance with various embodiments.

An EIDR handle or ID can have the following syntax, which can include a prefix and a suffix:

10.5240/XXXX-XXXX-XXXX-XXXX-XXXX-C

The prefix, 10.5240, indicates the resolution system, which in this case is 10.5240 for the EIDR registry. The suffix, XXXX-XXXX-XXXX-XXXX-XXXX-C, identifies an object within that system/EIDR registry. The suffix can comprise hexadecimal digits (XXXX-XXXX-XXXX-XXXX-XXXX) and an ISO 7064 Mod 37,36 check character, C.

Figure 2:
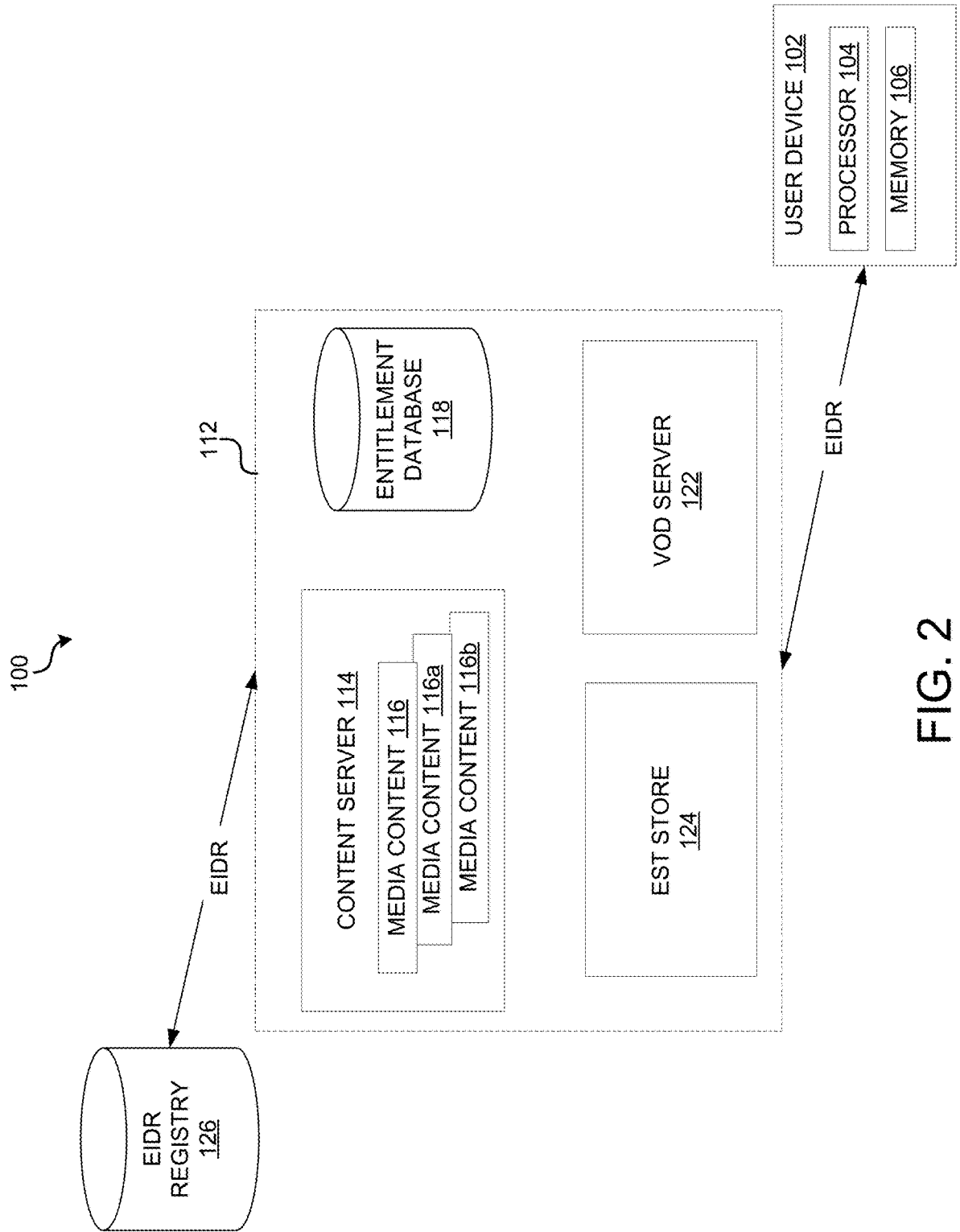
FIG. 2 illustrates the use of metadata to enable obtaining alternative viewing options in the environment of FIG. 1.

FIG. 2 is a diagram illustrating one example of the use of EIDR handles for allowing alternative versions of media content to be identified, obtained, and presented to a viewer. FIG. 2 illustrates various elements of system 100, previously illustrated in FIG. 1 and described above, including content provider 112 and user device 102.

An EIDR handle can be assigned by an author of the media content, e.g., a studio entity that created the media content, a content provider, etc. Regardless of how/by whom an EIDR handle is assigned, each piece of media content may be associated with an EIDR handle. Referring back to a previously described example, a viewer can view a linearly broadcast version of media content 116a broadcast by content provider 112 (which in this example, is also a broadcast entity) to a user device 102. The linearly broadcast version of media content 116a, e.g., a televised version of a movie, can be associated with or have embedded therein, an EIDR handle that identifies the televised version of the movie. That EIDR handle can be passed between one or more entities/elements/modules to allow an alternative version(s) of the media content 116b to be identified.

In particular, and in this example, upon a viewer of the linearly broadcast version of the media content 116a opting to purchase or rent an alternative version of the media content 116b, the EIDR handle of the linearly broadcast version of the movie can be scanned or otherwise determined. Upon obtaining the EIDR handle of the linearly broadcast version of the media content 116a, the content provider 112 can access an EIDR registry 126 (which can be a centralized registry accessible by content provider 112). The EIDR can be utilized to determine an existing alternative version(s) of the media content 116b, which may be associated with a related EIDR handle, for example. For example, and in the case of "families" of media content, each media content instance can be assigned an EIDR handle that is mapped to a parent EIDR handle. Hence, a single EIDR handle can identify any one of a number of versions of the media content, and alternative versions of the media content can be determined by the use of pointers and/or otherwise navigating the structure of EIDR registry 126.

It should be noted that in accordance with other embodiments, scanning or determining the EIDR of the linearly broadcast version of the media content 116a can be performed at the outset of broadcasting, upon presentation/scheduling on an EPG, or some other preferred/appropriate time. In this way, alternative versions of the media content 116b can be pre-determined and presented as a purchase or rental option to a viewer. In any of the embodiments described herein, scanning and/or passage of the EIDR handle can occur between various modules and/or entities. In the example illustrated in FIG. 2, any one of content server 114, VOD server 122, EST store 124 and/or user device 102 may at some point during the viewing and/or purchase/rental of alternative versions of the movie, scan for or otherwise determine the EIDR handle of the applicable media content.

Upon determining what alternative version(s) of the media content 116b a viewer wishes to purchase or rent via the EIDR handle, the viewer can perform the purchase/rental transaction via an electronic sell through (EST) store/transaction environment 124. The alternative version(s) of the media content can be accessed from content server 114, and subsequently presented via VOD server 122.

In addition to determining the appropriate EIDR handle associated with media content, various embodiments provide for the determination of a timecode in order to synchronize playback of alternative media content with that of current media content that is/was originally being played back. As described above, a viewer can be given the option to view alternative media content from the beginning or to continue playback from the same point at which the current media content was "paused" to obtain the alternative media content.

A timecode can refer to a series of numbers generated in a controlled sequence by some timing system during production, filming, editing, or otherwise during media content generation. A timecode can be overlaid onto, e.g., video content, or hidden as metadata therein. Timecodes for recorded video can follow an hours:minutes:seconds:frames format, for example. Alternatively, timecodes for film can follow a simpler frame-only format, which reflects every frame from the number 1 to the total number of frames in the film.

Various embodiments can determine the timecode associated with a point in time at which media content currently being played is paused to obtain an alternative version of the media content. Referring back to FIG. 2, user device 102 may determine the timecode associated with a point in time/playback when media content playback is paused to obtain alternative media content. For example, user device 102 may record or take note of when playback is paused during viewing of media content in order to present purchase/rental options to a viewer. Prior to playback of an alternative version of the media content, user device 102 can communicate with VOD server 122 to synchronize or coordinate playback of the alternative version of the media content based upon the recorded timecode.

Alternatively, user device 102 alone can control playback of the alternative version of the media content without involving VOD server 122. That is, user device 102 can determine the recorded timecode and leverage its own internal playback control functionality (that may be conventionally used for controlling playback of VOD or DVR'ed content) to begin playback of the alternative version of the media content based on the recorded timecode.

It should be noted that other points during playback of the (original) media content can be used as the relevant timecode. That is, and as described above, a transaction graphical user interface (GUI) can be presented to the viewer during playback of the media content to purchase/rent alternative content. In accordance with some embodiments, playback can continue in the background of the transaction GUI. Hence, playback of the alternative version of the media content can resume from a point in time when the actual purchase/rental transaction is completed rather than when it begins. Alternatively still, playback of the alternative media content can be adjusted, e.g., backwards, by some amount of time (10 seconds, for example,) prior to the pausing of the original media content or the completion of the purchase/rental transaction.

In the event the viewer does not select the option to begin playback of the alternative version of the media content from the time at which the original media content was paused, the timecode can be ignored or not recorded at all. Hence, playback of the alternative version of the media content can commence at its beginning.

FIG. 3A illustrates example GUIs that can be presented to a viewer for conducting transactions to obtain one or more alternative versions of media content in accordance with one embodiment. FIG. 3A illustrates an example of an EPG 130 presented on display 108. EPG 130 presents a listing of scheduled programming on one or more channels, e.g., programs 1-6. Upon selection of a scheduled program, e.g., program 5, a pop-up options menu 132 can be displayed to a viewer. Options menu 132 can include a plurality of options, including, but not limited to the following: an option to view the selected program (as a linear broadcast); an option to obtain more information regarding the selected program (e.g., possible alternative versions of the program that are available for purchase/rent); an option to purchase/rent the alternative version(s) of the program; and an option to switch feeds to an existing alternative version of the program (e.g., stored in a local library). Program guide 130 may further include a preview window 134 for previewing the selected program, associated programs/channels, advertising, etc.

It should be noted that the GUI need not necessarily be presented within the same viewing environment. That is, a transaction GUI can be configured to pop up on a different device, such as a smart phone, to conduct the transaction if need be. For example, a viewer's smart phone may be associated with a third-party distributor, where a third-party distributor mobile application can be utilized to conduct/complete the transaction. Again, the viewer need not leave or otherwise disrupt the viewing environment (or in this example, the EPG) to conduct the transaction.

FIG. 3B is a flow chart illustrating example processes performed for obtaining alternative versions of media content via the GUI of FIG. 3A. At operation 302, an EPG can be presented to a viewer. As described above, the EPG can be provided by a broadcast entity, such as a cable provider, to a viewer via a user device, such as a set-top box. The EPG can also be provided by some other content provider. At operation 304, a program selection can be received via the EPG. That is, the viewer may select a program listed/scheduled on the EPG. At operation 306, one or more alternative viewing options associated with the selected program can be provided to the viewer (via the EPG).

At operation 308, an entitlement database can be checked to determine possible alternative viewing options in which the viewer can engage. For example, the entitlement database may have entitlement information therein indicating that an alternative version of the selected program has already been purchased/rented by the viewer and is available for viewing. As another example, the entitlement database may have entitlement information therein indicating that one or more alternative versions of the selected program can be purchased/rented by the viewer. That is, the entitlement information may include one or more DRM licenses that require a fee (e.g., purchase or rental) in order to unlock the alternative version of the selected program.

At operation 310, and if the entitlement information accessed within the entitlement information suggests that one or more alternative versions of the selected program have been purchased/rented, an option to "watch from library" can be presented to the viewer. This option can be presented in the form of, e.g., a pop-up menu (e.g., options menu 132), that is displayed to the user via the EPG screen. At operation 312, an indication that the viewer has selected the "watch from library" selection may be received. At operation 314, playback for the previously purchased/rented alternative version of the selected program can begin. In the case of obtaining alternative media content from an EPG environment, playback may generally begin from the beginning of the selected program, although playback can be initiated at other points. For example, if the viewer was in the process of viewing the already purchased/rented alternative version at some earlier time, playback may continue from that point.

At operation 316, if the entitlement information accessed within the entitlement information suggests that the viewer has the option to purchase and/or rent an alternative version of the selected program, a menu displaying these options can be presented to the viewer. Again, these options can be presented to the viewer in the form of pop-up menu (e.g., options menu 132) or other interactive GUI element(s). At operation 318, an indication that the viewer has selected the option to purchase or rent the selected program may be received. At operation 320, the purchase/rental transaction for the alternative version of the selected program can be conducted. As previously described, the purchase/rental transaction can occur via a third-party distributor transaction mechanism, a broadcast entity transaction mechanism via a transaction GUI displayed within the EPG environment or on an associated device, etc. At operation 322, the requisite entitlement can be recorded to the entitlement database, e.g., satisfying any DRM license requirements. At operation 324, playback of the purchased/rented alternative version of the selected program can commence. It should be noted, however, that the viewer can opt to view the alternative version of the selected program at a later time if so desired.

FIGS. 4A and 4B illustrate example GUIs that can be presented to a viewer of media content allowing the viewer to purchase/rent or access an already purchased/rented alternative version of the media content in accordance with various embodiments. In the example illustrated in FIG. 4A, a viewer may be viewing a linearly broadcast version of a movie that was originally intended for viewing in a theatrical environment. As described above, the linearly broadcast version may, therefore, be edited in some manner, whether for timing purposes, for content, etc. During presentation of the linearly broadcast version of the movie, a pop-up menu 140 can be displayed to the viewer allowing the viewer to view additional information regarding the movie, as well as purchase/rental transaction options for an alternative version(s) of the movie. This additional information can be used to present information regarding alternative versions of the movie to the viewer, which may be purchased/rented. In this context, the pop-up options menu 140 can be displayed in response to the viewer selecting, e.g., a visual prompt advertising the availability of such additional information and purchase/rental options. Alternatively, the pop-up options menu 140 can be periodically displayed throughout the linear broadcast.

In the example illustrated in FIG. 4B, the pop-up options menu 142 can display one or more options to view additional information regarding the linearly broadcast version of the movie. As previously described, this additional information can be used to present information regarding alternative versions of the movie to the viewer, which may be purchased/rented. In the event that one or more of the alternative versions of the movie has already been purchased/rented by the viewer, this can be indicated to the viewer as well. Moreover, pop-up options menu 142 can display an option to conduct to view any alternative version of the movie that was previously purchased/rented by the viewer.

It should be noted that pop-up options menu 140 and/or 142 can be displayed to a viewer watching DVR'ed media content on display 108 rather than linearly broadcast content. Identification of the DVR'ed media content can be accomplished in a similar manner as that described above with regard to linearly broadcast media content, e.g., by scanning the DVR'ed media content for its associated EIDR handle.

FIG. 4C illustrates an example transaction environment 141 to which the viewer can be redirected upon selecting the option (via pop-up options menu 140) to either purchase or rent an alternative version of the movie. Transaction environment 141 may be, e.g., a transactions website for a digital content distributor. This redirection can occur when a viewer has not linked his/her digital content distributor account with his/her cable provider account, for example.

FIG. 4D illustrates an example playback menu 143. The viewer can select whether to restart playback of the alternative version of the movie from the beginning, or to resume playback from the same point at which the viewer paused to obtain the alternative version of the movie (e.g., in the linear broadcast, the DVR'ed presentation, etc.).

FIG. 4E illustrates an example up-sell menu 145. As described previously, a content provider can provide one or more up-sell options to the viewer. For example, and upon the viewer selecting the option (via pop-up options menu 140) to obtain "More Info" regarding Program 5, up-sell menu 145 can be displayed to the user on display 108. Up-sell menu 145, in this example, provides the viewer with additional options to purchase or rent a sequel to Program 5.

FIG. 4F illustrates an example media content library listing or GUI 147 that can be displayed to the viewer in the event that the viewer wishes to search/peruse for an existing, alternative version of media content that is currently being broadcast or displayed/included in an EPG. That is, and during the viewing of, e.g., broadcast or DVR'ed media content, or when perusing an EPG, the viewer can be presented with a search environment that lists the content stored in a local media content repository. Media content library GUI 147 can be displayed pursuant to the viewer selecting the option (via pop-up options menu 142) to watch an alternative version from the library, or pursuant to "independent" action of the viewer to search for existing media content.

FIG. 4G is a flow chart illustrating example processes performed in accordance with various embodiments for obtaining alternative versions of media content via the GUIs of FIGS. 4A and 4B. At operation 400, and during a broadcast of media content, at least one option can be presented to a user to experience an alternative version of the media content. Receipt of such broadcast media content can be at a user device, such as a set-top box, laptop PC, or other like device, where the broadcast media content can include a linearly broadcast movie, a DVR'ed copy of a televised version of the movie, etc. Presentation of the at least one option can be accomplished through, e.g., the aforementioned pop-up options menus of FIGS. 4A and 4B. The at least one option can include the option to view a previously purchased/rented alternative version of the media content, or the option to purchase/rent an alternative version of the media content. At operation 402, and upon selection of the at least one option to experience an alternative version of the media content, the alternative version of the media content is presented to the user device.

It should be noted that although various embodiments presented herein have been described in the context of video/visual-based media content, other embodiments can be adapted for use in other contexts, such as radio broadcasting, podcasting, etc. Moreover, the systems and methods described herein can be adapted for use in allowing users/consumers to purchase/rent or access previously purchased/rented "full access" versions of "limited access" games, applications, and other such content.

Figure 5:
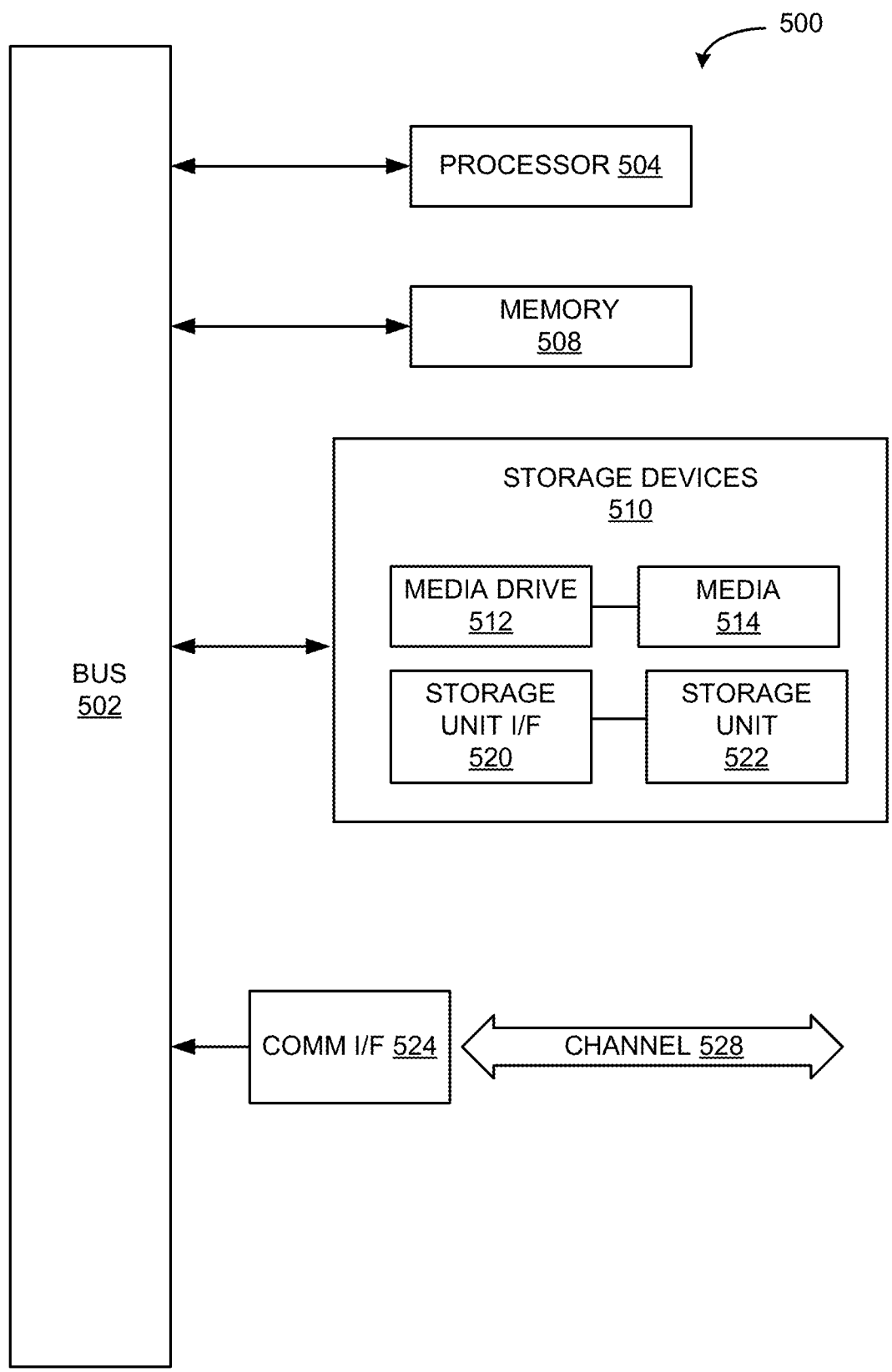
FIG. 5 is an example computing module that may be used to implement various features of embodiments described in the present disclosure.

FIG. 5 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the application using other computing modules or architectures.

Referring now to FIG. 5, computing module 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example navigation systems, portable computing devices, and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 600 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
    prior to a broadcast of edited media content to a user device from a broadcast entity, linking a viewer's first account associated with a third-party distributor and the viewer's second account associated with the broadcast entity;
    during the broadcast of the edited media content from the broadcast entity to the user device, scanning a media content server associated with the third-party distributor for an original, unedited content version of the edited media content, and presenting at least one option to a user to experience the original, unedited content version of the edited media content, including an option to purchase the original, unedited content version of the edited media content and an option to rent the original, unedited content version of the edited media content;
    upon selection of the at least one option, pausing the program and presenting the original, unedited content version of the edited media content to the user device, the presentation of the original, unedited content version of the edited media content being contingent upon at least one of background authentication and background entitlement actions occurring between the third-party distributor and the broadcast entity; and
    presenting at least one option to the user to experience at least one of a prequel to the edited media content and a sequel to the edited media content.

2. The computer-implemented method of claim 1, wherein the media content broadcast to the user device comprises an altered version of the edited media content comporting with at least one of broadcasting timing requirements and broadcasting censorship requirements.

3. The computer-implemented method of claim 1, wherein the original, unedited content version of the edited media content comprises a different version of the media content.

4. The computer-implemented method of claim 1, wherein at least one of the purchase and rental of the original, unedited content version of the edited media content comprises a purchase transaction completed between the broadcast entity providing the edited media content broadcast to the user device and the third-party distributor of the original, unedited content version of the edited media content.

5. The computer-implemented method of claim 4, wherein the presentation of the original, unedited content version of the edited media content is enabled via a digital media content access authorization obtained by the broadcast entity from the third-party distributor.

6. The computer-implemented method of claim 1, further comprising determining the original, unedited content version of the edited media content based upon a metadata identifier registered in a metadata registry and included within the edited media content that is broadcast to the user device.

7. The computer-implemented method of claim 6, wherein the metadata identifier comprises an Entertainment ID Registry handle and the metadata registry comprises an EIDR Registry.

8. A non-transitory computer readable medium having computer executable program code embodied thereon, the computer executable program code configured to cause a processor to:
    prior to a broadcast of a program to a user device from a broadcast entity, link a viewer's first account associated with a third-party distributor and the viewer's second account associated with the broadcast entity;
    broadcast the program to the user device;
    scan a media content server associated with the third-party distributor for an original, unedited content version of the program;
    present alternative viewing options for the program listed on an electronic program guide (EPG) for linear broadcast transmission, wherein the alternative viewing options comprise at least one option for the user to experience the original, unedited content version of the edited media content, including an option to purchase the original, unedited content version of the edited media content and an option to rent the original, unedited content version of the edited media content;
    upon receiving an alternative viewing option selection from a user for the program, pause the program and begin playback of the original, unedited content version of the program on a user device pursuant to at least one of background authentication and background entitlement occurring between the third-party distributor and the broadcast entity; and
    present at least one option to the user to experience at least one of a prequel to the edited media content and a sequel to the edited media content.

9. The non-transitory computer readable medium of claim 8, wherein the computer executable program code is configured to further cause the processor to conduct a background payment transaction to complete the purchase or rental of the original, unedited content version of the program.

10. The non-transitory computer readable medium of claim 9, wherein the computer executable program code is configured to further cause the processor to record entitlement information enabling the playback of the original, unedited content version of the program.

11. An apparatus, comprising:
    a processor configured to link a viewer's first account associated with a third-party distributor and the viewer's second account associated with the broadcast entity, receive a broadcast version of media content from the broadcast entity, display the broadcast version of media content on a user device, scan a media content server associated with the third-party distributor for an original, unedited content version of the edited media content, transmit the original, unedited content version of a broadcast version of media content to a user device, receive an indication from the user device to view the original, unedited content version of the media content, send the original, unedited content version of the media content to the user device pursuant to at least one of background payment, background authentication and background entitlement actions occurring between the third-party distributor and the broadcast entity, present alternative viewing options comprising at least one option for the user to experience the original, unedited content version of the edited media content, including an option to purchase the original, unedited content version of the edited media content and an option to rent the original, unedited content version of the edited media content, upon receiving an alternative viewing option selection from the user for the program, pause the program and begin playback of the original, unedited content version of the program on the user device, and present at least one option to the user to experience at least one of a prequel to the edited media content and a sequel to the edited media content.

12. The apparatus of claim 11, wherein the processor is further configured to access an entitlement database configured to at least one of store and maintain digital rights management information enabling the retrieval and consumption of the original, unedited content version of the media content to complete the background entitlement action.

* * * * *